United States Patent [19]

Nelson

[11] Patent Number: 4,625,542
[45] Date of Patent: Dec. 2, 1986

[54] RADIATION POWER MEASURING APPARATUS
[75] Inventor: Craig E. Nelson, Seattle, Wash.
[73] Assignee: TAB Leasing, Seattle, Wash.
[21] Appl. No.: 775,625
[22] Filed: Sep. 13, 1985

Related U.S. Application Data

[63] Continuation-in-part of Ser. No. 650,819, Sep. 14, 1984.
[51] Int. Cl.[4] ............................................. G01H 3/10
[52] U.S. Cl. ....................................... 73/1 R; 73/646
[58] Field of Search ............ 73/1 R, 1 DV, 646, 647; 367/13; 250/336.1, 338 R

[56] References Cited

U.S. PATENT DOCUMENTS

| | | | |
|---|---|---|---|
| 2,531,844 | 11/1950 | Fiedler | 181/0.5 |
| 3,465,149 | 9/1969 | Flint | 250/338 |
| 3,466,924 | 9/1969 | Roshon et al. | 73/1 |
| 3,744,294 | 7/1973 | Lewis et al. | 73/1 |
| 3,831,028 | 8/1974 | Kerlman et al. | 250/336.1 |
| 3,959,770 | 5/1976 | Schaefer | 340/146.1 |
| 4,039,767 | 8/1977 | Leschek | 179/175.1 |
| 4,160,388 | 7/1979 | Carriere | 73/646 |
| 4,179,937 | 12/1979 | Koblanski | 73/646 |
| 4,181,004 | 1/1980 | Doming et al. | 73/1 DV |
| 4,391,124 | 7/1983 | Drost et al. | 73/1 |
| 4,408,494 | 10/1983 | Koblanski | 73/646 |
| 4,430,883 | 2/1984 | Auphan | 73/1 |
| 4,561,285 | 12/1985 | Nelson et al. | 73/1 DV |

FOREIGN PATENT DOCUMENTS

| | | | |
|---|---|---|---|
| 979607 | 9/1956 | Fed. Rep. of Germany . | |
| 2124376 | 2/1984 | United Kingdom . | |
| 0587344 | 1/1978 | U.S.S.R. | 250/338 |

OTHER PUBLICATIONS

"Ultrasonic Transducer Analyzer", NASA Tech Briefs, p. 2045, Spring 1981.
"Ultrasonic Transducer Power Output by Modulated Radiation Pressure", M. Greenspan et al., J. Acoust. Soc. Am. 63(4), Apr. 1978, pp.1031-1038.
"Automated Pulsed Technique for Measuring Phase and Amplitude Response of Saw Devices", J. H. Holtham et al., 1978 Ultrasonics Symposium Proceedings, IEEE Cat. pp. 607-610.
"Report of Task II—Radiation Force Balance System—Construction & Use", Banjavic et al., publication data (if any) unknown.
"Determination of Acoustic Power Outputs in the Microwatt—Milliwatt Range", James A. Rooney, Ultrasound in Med. & Biol., vol. 1, pp. 1-4.
Walsh, "Photometry", 1953, Constable and Company Ltd, London, pp. 36-37.
Arnold, "Broadband Photophoretic Spectroscopy" 1980, Optical Soc. of America, vol. 5, No. 6, pp. 242-244.
Preston, "Medical Ultrasonic Standards at NPL", 1984, IEEE Proceedings, vol. 131, Pt. A, No. 4.

Primary Examiner—Stewart J. Levy
Assistant Examiner—Robert R. Raevis
Attorney, Agent, or Firm—Christensen, O'Connor, Johnson & Kindness

[57] ABSTRACT

Apparatus for measuring the power of radiation that includes float means (16) and force balancing means (48, 50, 60, 80). The float means includes a target (46) for the radiation and is constructed such that the net gravitational force, including buoyancy force, if any, acting on the float means tends to accelerate the float means in a first direction. The force balancing means includes drive means (80) for providing a drive signal and means (50) responsive to the drive signal for exerting a balancing force on the float means in a second direction opposite the first direction, such that the magnitude of the balancing force corresponds to a characteristic of the drive signal. The drive means is adapted to vary such characteristic of the drive signal, to thereby vary the balancing force, such that when the drive signal is controlled so as to cause the float means to be suspended at a predetermined height, the characteristic of the drive signal provides a measure of the force exerted on a target as a result of the radiation striking the target, and therefore of the power of the radiation. The float means preferably comprises a magnetic material (48) and the force balancing means comprises an electromagnet (50). The apparatus may directly measures the force of acoustical or electromagnetic radiation on the target, or may measure the change in buoyancy of the target caused by electromagnetic radiation heating and changing the density of the target.

26 Claims, 8 Drawing Figures

RADIATION POWER MEASURING APPARATUS

RELATED APPLICATION

This is a continuation-in-part of U.S. patent application, Ser. No. 650,819, filed Sept. 14, 1984, entitled Apparatus for Measuring the Power of Acoustic Radiation.

1. Field of the Invention

The present invention relates to the measurement of the power of radiation, such as acoustic and electromagnetic radiation, by measuring the forces resulting from the radiation striking a target.

2. Background of the Invention

The widespread use of medical ultrasonic instruments has led to an increased need for the capability to accurately measure the power output of acoustic transducers, particularly ultrasonic transducers. Prior techniques for measuring acoustic power have included the force balance method and the use of calibrated hydrophones. The present invention is in part directed to an improved technique for measuring acoustic power using the force balance method. As will be described, the technique is also applicable to the measurement of the power of elecromagnetic radiation. The power of electromagnetic radiation is determined either by measuring the direct force of the radiation on the target or by measuring the change in the buoyancy force resulting from heating of the target by the electromagnetic radiation. The present invention therefore has general application to the fields of radiometry and calorimetry.

The force balance method for acoustic power measurement takes advantage of the fact that when acoustic energy is absorbed or reflected, a force is exerted upon the absorber or reflector in direct proportion to the power of the incident radiation. For acoustic waves in water, it has been shown that the relation between force and acoustic power is linear. A device may therefore be constructed that allows the power of acoustic radiation to be measured by transducing the radiation into a force. The problem with this approach is that for acoustic power levels commonly encountered, the corresponding force is very small. Furthermore, because ultrasonic radiation is rapidly attenuated in air, the force measurement for ultrasonic radiation must be made in a liquid such as water.

One early force balance technique used an absorbing or reflecting target suspended in water at the bottom end of a long pendulum. When laterally incident acoustic waves were absorbed or reflected by the target, the resulting force deflected the pendulum. The distance that the pendulum moved could be related to acoustic power if the geometry of the system and the weight of the components were known. In a related prior technique, an acoustic target was suspended in a fluid and mechanically coupled to a sensitive analytic balance. Radiation was then directed upward from a transducer below the target, and the resulting upward force measured by the balance.

One disadvantage of the simple systems described above is that as the incident acoustic power level changes, parts of the apparatus move and the overall system geometry changes. To overcome this source of inherent non-linearity, more recent efforts have used a "servo force balance" principle. A servo force balance device has an absorbing or reflecting target, a target position sensor, and a target positioning mechanism connected in a feedback loop, such that for any amount of force that the target may experience, the position of the target is maintained at a nominal zero position. The force measurement is made by noting the state of the target positioning mechanism before and after an unknown force is applied, the magnitude of the unknown force being proportional to the difference in state of the target positioning mechanism. The position in space of the target, and thus the measurement system geometry, is fixed both before, during and after the measurements are made. Consequently, a very linear response to incident force may be obtained.

Improved instruments of the servo force balance type have been built, and the value of this approach is well proven. Unfortunately, those devices proposed and built so far have a number of disadvantages. Such prior devices are often designed such that delicate and/or corrosion-prone components must be submerged in the liquid through which the sound must propagate. Furthermore, prior devices require a horizontally or upwardly directed acoustic beam, thus severely restricting the types of transducers that can be measured. Another major disadvantage of prior devices is that the acoustic targets have typically been in physical contact with their positioning mechanisms, thus causing a variety of friction, vibration and sticking problems that reduce the sensitivity and repeatability of measurements. Finally, the construction of prior devices has usually made it difficult or impossible to change measurement geometry or target types.

SUMMARY OF THE INVENTION

The present invention provides an apparatus for measuring the power of radiation that overcomes many of the limitations inherent in prior radiation power measuring devices. In its most general form, the apparatus comprises float means and force balancing means. The float means includes a target for the radiation and is constructed such that the net gravitational force, including buoyancy force, if any, acting on the float means tends to accelerate the float means in a first direction. The force balancing means includes drive means for providing a drive signal and means responsive to the drive signal for exerting a balancing force on the float means in a second direction opposite to the first direction, such that the magnitude of the balancing force corresponds to a characteristic of the drive signal. The drive means is adapted to vary such characteristic of the drive signal, to thereby vary the balancing force on the float means, such that when the drive signal is controlled so as to cause the float means to be suspended at a predetermined height, the characteristic of the drive signal provides a measure of the force exerted on the target as a result of radiation striking the target, and therefore of the power of the radiation. In a preferred embodiment, the float means comprises a magnetic material, and the force balancing means comprises an electromagnet positioned to exert a magnetic force in the second direction on the magnetic material. The force balancing means preferably includes means for controlling the drive signal such that the float means is suspended at the predetermined height, such means including sensor means adapted to produce a sensor signal corresponding to the height of the float means, and servo means responsive to the sensor singal for controlling the drive signal such that the float means is suspended at the predetermined height.

In a further aspect, the apparatus of the present invention comprises a housing and a fluid in the housing, the float means being immersed in the fluid, and the net gravitational force includes a buoyancy force exerted on the float means by the fluid. The housing includes an end wall shaped so as to form a hollow stem. The float means includes a projecting member that includes a magnetic material, and the relative sizes of the projecting member and the stem are such that the projecting member can move vertically within the stem without contacting the walls thereof. The apparatus further comprises means for providing a magnetic centering field that is operative to act on the magnetic material of the float means to prevent the projecting member from contacting the walls of the stem.

In one embodiment of the present invention for measuring the power of electromagnetic radiation, the target is adapted to absorb or reflect the electromagnetic radiation. In this embodiment, the net gravitational force is directed downward, and the electromagnet is positioned to exert an upward magnetic force on the float means. In a second embodiment for measuring the power of electromagnetic radiation, the target is adapted to absorb the electromagnetic radiation and to undergo a density change as a result of heating caused by absorption of such radiation. The force exerted on the target comprises a change in the buoyancy force. The fluid in which the float means is immersed may be a gas open to the atmosphere.

In a preferred embodiment for measuring the power of acoustic radiation, the apparatus of the present invention comprises a housing, float means positioned in the housing, the force balancing means. The housing includes bottom and side walls, the housing being adapted to contain a volume of liquid and to permit a source of acoustic radiation to radiate into the liquid. The float means includes an acoustic target and has a positive buoyancy when submerged in the liquid. The acoustic target may be either absorbing or reflecting. The force balancing means includes drive means for providing a drive signal, and means responsive to the drive signal for exerting a downward force on the float means such that the magnitude of the downward force corresponds to a characteristic of the drive signal. The drive means is adapted to vary such characteristic, to thereby vary the downward force on the float means, such that when the drive signal is controlled so as to cause the float means to be suspended at a predetermined height in the liquid, such characteristic provides a measure of the force exerted on the acoustic target by the acoustic radiation, and therefore a measure of the power of the acoustic radiation. The force balancing means may include means for controlling the drive signal such that the float means is suspended at the predetermined height. The apparatus may further comprise a removable insert positioned in the housing, the insert being adapted to match the characteristics of the source of acoustic radiation to the characteristics of the acoustic target.

DETAILED DESCRIPTION OF THE INVENTION

Figure 1:
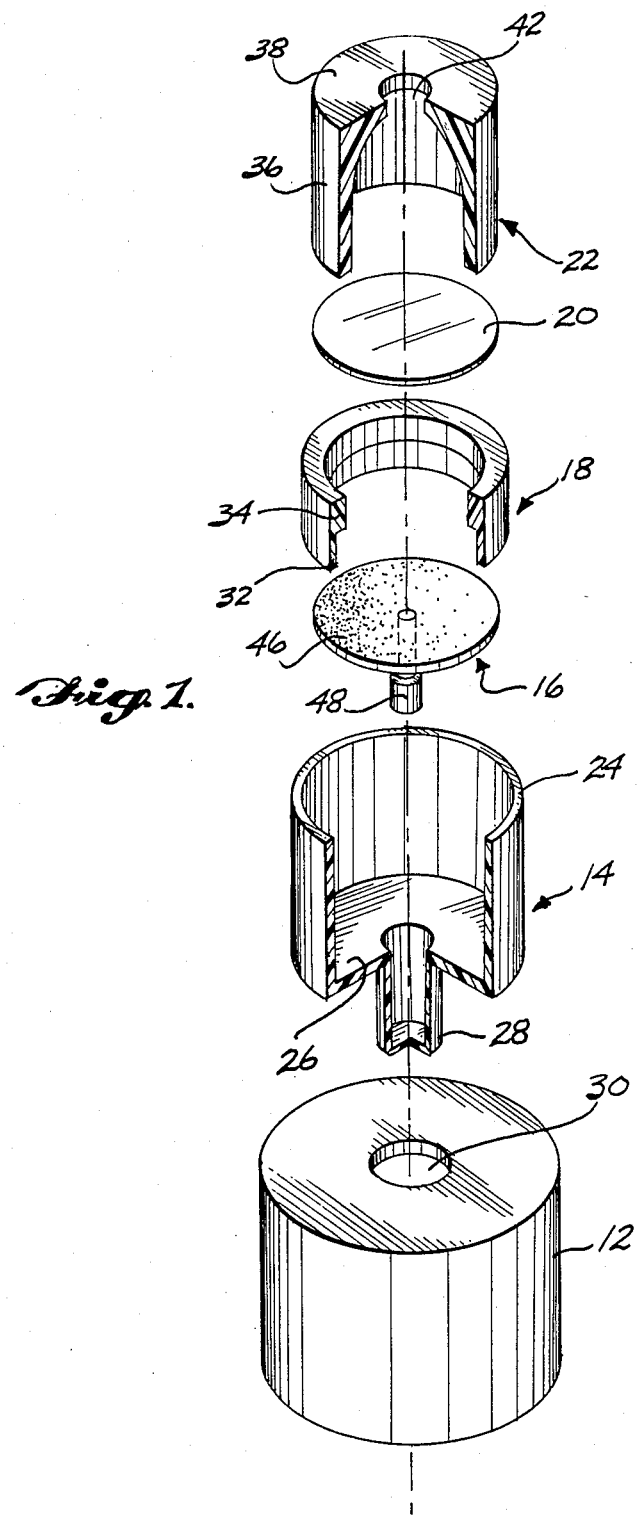
FIG. 1 is an exploded view of one preferred embodiment of the present invention.
Figure 2:
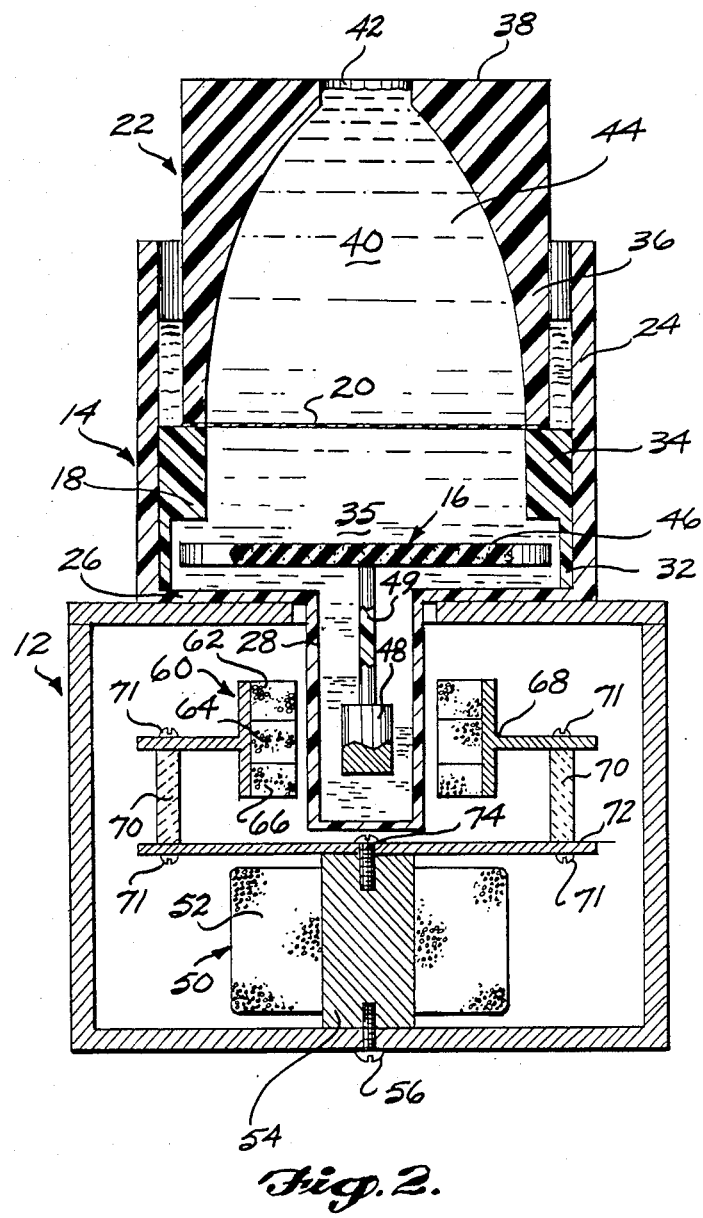
FIG. 2 is a vertical cross-sectional view of the assembled apparatus of FIG. 1.

One preferred embodiment of an acoustic power measuring device according to the present invention is shown in exploded view in FIG. 1 and in cross section in FIG. 2. The preferred embodiment comprises ferrous metal base 12, housing 14, float 16, lower insert 18, membrane 20 and upper insert 22. Housing 14 is composed of a nonmagnetic material such as plastic and includes cylindrical sidewall 24, lower wall 26 and depending tubular stem 28. The tubular stem is adapted for insertion into circular opening 30 in the upper surface of base 12. As illustrated below, the depending stem permits the corrosion sensitive components within base 12 to be located in air rather than in a liquid. Lower insert 18 is preferably composed of an acoustic reflecting material such as styrofoam, and includes lower portion 32 and upper portion 34. Both the lower and upper portions have cylindrical, tubular shaped that together serve to define lower chamber 35, the inner diameter of lower portion 32 being somewhat greater than the inner diameter of upper portion 34. The outer diameter of lower insert 18 is the same in both the upper and lower portions, and is dimensioned to match the inside diameter of sidewall 24 of housing 14.

Upper insert 22 comprises tubular sidewall 36 and upper wall 38, and is preferably composed of the same material as the lower insert. The outside diameter of sidewall 36 is constant, but the inside diameter of sidewall 36 decreases with increasing height, such that the upper insert defines upper chamber 40 that has a cross section that decreases with increasing height. Access to the upper chamber is provided by opening 42 in upper wall 38 of the upper insert. The inside diameter of the lower end of sidewall 36 matches the inside diameter of upper portion 34 of lower insert 18, such that lower chamber 35 forms a continuous extension of upper chamber 40. As illustrated in FIG. 2, housing 14 is adapted to be filled with a suitable liquid 44 such as water. Liquid 44 fills stem 28, lower chamber 35, upper chamber 40, and a portion of the space between housing 14 and sidewall 36 of the upper insert. Membrane 20 is bonded to and encloses the lower end of sidewall 36. Membrane 20 is preferably composed of a thin, flexible plastic material that is capable of freely passing acoustic radiation from upper chamber 40 into lower chamber 35 when both chambers contain the liquid. The use of membrane 20 is optional, and the membrane may be omitted if desired.

Float 16 includes acoustic target 46 having the shape of a circular disk, and block 48 of magnetic material suspended beneath target 46 by support 49. The diameter of acoustic target 46 is less than the inside diameter of lower portion 32 but preferably greater than the inside diameter of upper portion 34. Block 48 is generally cylindrical in shape, and is dimensioned to fit within stem 28 without contacting the sidewalls thereof. The composition of acoustic target 46 depends upon whether the acoustic target is intended to be an absorber or a reflector of acoustic radiation. In the embodiment of FIGS. 1 and 2, acoustic target 46 is adapted to absorb acoustic radiation. In such a case, suitable materials for the acoustic target include was and rubber. The composition of the acoustic target should also be controlled such that float 16 as a whole has a positive buoyancy in liquid 44, such that in the absence of magnetic fields, float 16 will move upward through liquid 44 until acoustic target 46 contacts the lower edge of upper portion 34 of lower insert 18.

Referring now to FIG. 2, the interior of housing 12 includes electromagnet 50 and linear variable differential transformer (LVDT) 60. Electromagnet 50 includes coil 52 and ferrous core 54, core 54 being mounted at its lower end to housing 12 by means of screw 56. The purpose of electromagnet 50 is to exert a downward magnetic force on block 48, as described in greater detail below. LVDT 60 consists of coils 62, 64 and 66 mounted on nonferrous metal support collar 68. Collar 68 is in turn mounted by ceramic support pillars 70 and screws 71 to nonferrous metal disk 72, disk 72 in turn being mounted to core 54 of electromagnet 50 by screw 74.

In operation, a source of acoustic radiation whose power output is to be measured is inserted into opening 42 in upper insert 22, such that the source radiates acoustic energy directly into liquid 44 in upper chamber 40. Sidewall 36 of upper insert 22 has an approximately parabolic shape, such that the acoustic radiation emerges from upper chamber 40 approximately equally spread oer the cross section of membrane 20. The spread out acoustic radiation then passes through membrane 20 and lower chamber 35, and impinges on and is absorbed by acoustic target 46, resulting in a downward force upon float 16. Membrane 20 minimizes eddy currents in liquid 44 resulting from the downward flow of acoustic energy. To be effective, membrane 20 should be closer to target 46 than to the source of acoustic radiation. The geometry of the apparatus of FIGS. 1 and 2 is particularly suited to the measurement of the acoustic power produced by sector scanning medical ultrasound equipment.

Figure 3:
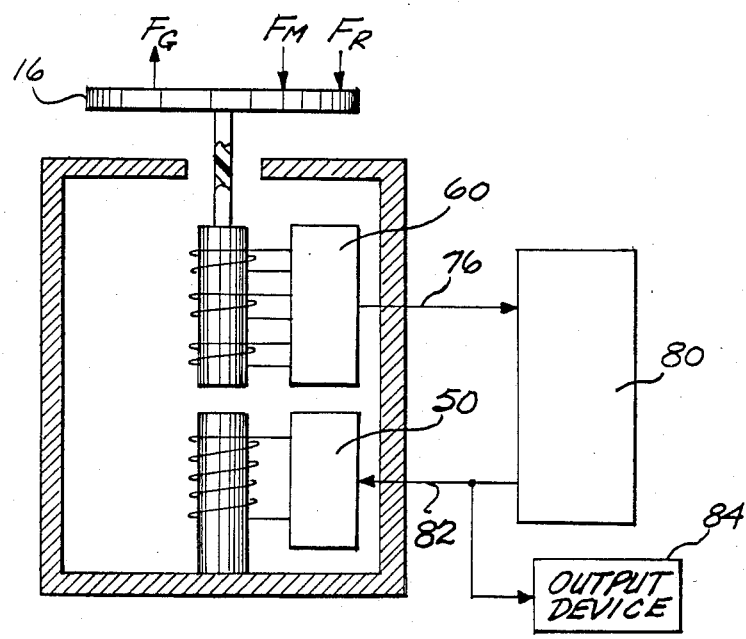
FIG. 3 is a partially schematic view of the force balancing system of the apparatus of FIG. 2.

FIG. 3 schematically illustrates the method by which the downward radiation force on float 16 is measured. As illustrated, LVDT 60 produces sensor signal 76 that corresponds to the height of block 48 in stem 28, i.e., to the height of float 16. Sensor signal 76 input into servo control system 80, and the servo control system in response produces control signal 82 that forms the drive signal for electromagnet 50. Servo control system 80 adjusts control signal 82 such that the electromagnet holds float 16 at a preestablished "zero" level. The zero level is established at a height at which acoustic target 46 is not in contact with lower wall 26 of housing 14 or with the lower edge of upper portion 34 of lower insert 18. Output device 84 determines the magnitude of control signal 82 before and after the introduction of acoustic radiation. Such control signal magnitudes are then used to determine the power of the acoustic radiation, as described below. Preferably, the output device includes means for averaging the control signal, both before and after the introduction of radiation, to eliminate the effects of mechanical and electrical noise.

The four vertical forces acting upon float 16 are the force of gravity, a buoyant force due to liquid 44, the magnetic force $F_M$ caused by the attraction of block 48 by electromagnet 50, and the radiation force $F_R$. As described below, there is also a lateral resoring force that acts to maintain block 48 centered in stem 28. The buoyant forceis ultimately caused by the force of gravity acting through liquid 44, and the force of gravity on the float and the buoyant force can therefore be considered as a single net gravitational force $F_G$. In the embodiment of FIGS. 1 and 2, float 16 is constructed to have a positive buoyancy in liquid 44, and the gravitational force $F_G$ therefore acts in an upward direction. The remaining two forces act in a downward direction.

In order to measure the power of acoustic radiation, the magnitude of control signal 82 is first measured prior to the introduction of the acoustic radiation into upper chamber 40. In this circumstance, servo control system 80 will adjust the control signal, and thereby the magnetic field of electromagnet 50, such that the float is stationary at its zero level, at which time:

$$F_G + F_{M1} = 0 \qquad (1)$$

where $F_{M1}$ designates the magnitude of the magnetic force on the float at the zero level prior to the introduction of acoustic radiation. In equation (1) and below, it will be assumed that the sign of a downward force is positive and that the sign of an upward force is negative. After control signal 82 has been measured in the absence of acoustic radiation, an acoustic transducer whose power output is to be measured is introduced into opening 42 such that the transducer radiates power directly into liquid 44 in upper chamber 40 resulting in an additional downward force $F_R$ on the float. Servo system 80 responds by adjusting the control signal and the magnetic field such that the float remains at its zero level, at which time:

$$F_G + F_{M2} + F_R = 0 \qquad (2)$$

where $F_{M2}$ is the magnitude of the magnetic force required to hold the float at the zero level in the presence of the acoustic radiation. Combining equations 1 and 2:

$$F_R = F_{M1} - F_{M2} \qquad (3)$$

Therefore, once the relationship between $F_M$ and control signal 82 is established by calibration procedures, the measurement of the control signal before and after the application of acoustic radiation produces a straightforward determination of the force due to the acoustic radiation, and therefore of the power of the acoustic radiation. A suitable calibration apparatus is disclosed in U.S. patent application Ser. No. 650,805, invented by Craig E. Nelson and Marvin L. Strenge, entitled Thermally Isolated Calibration Apparatus, filed Sept. 14, 1984, and assigned to the assignee of the present application.

In addition to providing a downward force to counteract the gravitational force on the float, the magnetic force produced by electromagnet 50 serves the further important purpose of centering float 16 and preventing contact between the float and the surrounding housing. The magnetic field produced by electromagnet 50 is concentrated along the axis of core 54. By positioning core 54 to be coaxial with housing 14 and stem 28, the field produced by electromagnet 50 produces both downward forces and inward, lateral forces on block 48 that tend to hold block 48 aligned with the core axis. Float 16 is thereby held out of contact with the surrounding housing. The lack of contact between the float and the housing permits the float to respond to very small changes in $F_R$ without friction or other unwanted forces coming into play.

Prior acoustic power measuring devices are known in which a neutral buoyancy float is suspended in a liquid, and in which the downward force due to acoustic radiation is counterbalanced by an upward magnetic force. The apparatus illustrated in FIGS. 1-3 possesses a number of very significant advantages with respect to such prior radiometers. The most far reaching advantage is that in applicant's device, there is no mechanical contact of any kind between float 16 and other parts of the apparatus. The result is that applicant's device is far more sensitive and far less error prone than prior acoustic power measuring devices. A related advantage is that in applicant's device, the center of action of the downward magnetic force on float 16 is lower than the center of action of the upward gravitational force on the float. The counterbalancing of these two forces thereby tends to align and center the float. This self centering effect eliminates the need for complex mechanical centering and bearing arrangements and makes possible the use of a float having no mechanical contact whatsoever with the surrounding apparatus. A further benefit flowing from applicant's noncontacting system is that the magnetic means for both sensing and controlling the height of the float can be maintained out of contact with liquid 40. This feature permits the use of a preferred fluid such as water, rather than a less advantageous fluid such as oil, oil being required in prior devices to prevent corrosion of the sensing, magnetic deflection and mechanical centering apparatus. A further advantage and improvement realized in the present invention is the use of a single element, block 48, to provide both the means for sensing the position of the float and for the application of the magnetic force for controlling the height of the float.

Figure 4:
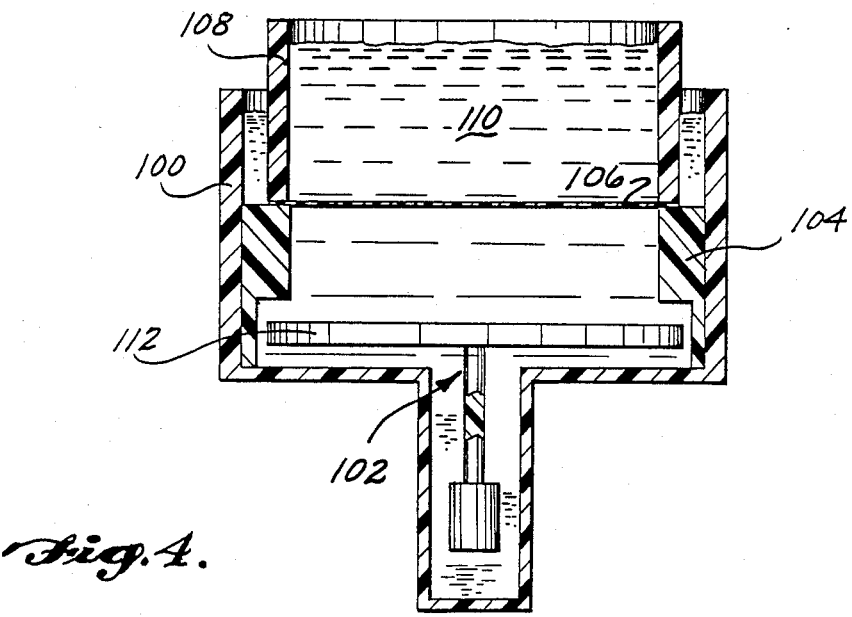
FIG. 4 is a vertical cross-sectional view of a portion of a second preferred embodiment of the present invention.

A second preferred embodiment of the invention is partially illustrated in FIG. 4. The second embodiment comprises housing 100, float 102, lower insert 104 and membrane 106, these elements being identical to the corresponding elements of the embodiment of FIG. 2. The embodiment of FIG. 4 further comprises upper insert 108 having vertical interior sidewalls, such that upper chamber 110 formed by the upper insert has a cross section that is essentially constant with height. The embodiment of FIG. 4 is adapted for use with acoutic transducers that have a comparatively large surface area comparable to the area of acoustic target 112 of float 102.

The embodiment of FIG. 4 illustrates another important advantage of the present invention, the advantage being that acoustic sources of almost any shape, size or geometry can be accommodated by the present invention merely by modifying the upper insert. In addition, because housing 14 can be readily removed from base 12 (FIG. 1), comparatively large changes in system geometry can easily be accomplished by providing housings of different sizes and/or shapes. The apparatus of the present invention can therefore readily be adapted to measure the power output of almost any acoustic transducer. Finally, the fact that the target is not mechanically attached to the housing means that different targets can readily be installed, as described in more detail below. It is further to be noted that the targets, inserts (including membranes) and housings can be modified independently from one another. The result of these features is an extremely adaptable device for measuring radiation power.

Figure 5:
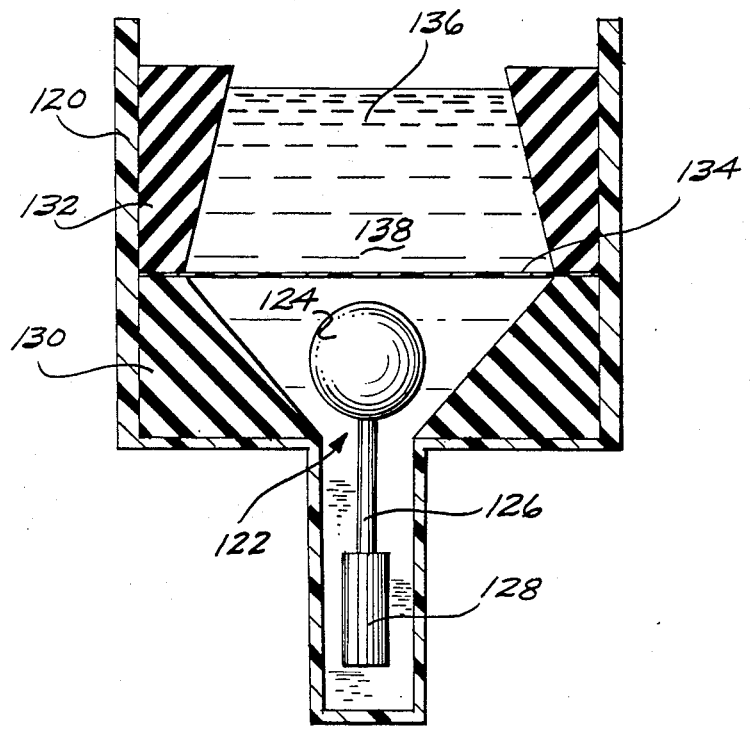
FIG. 5 is a vertical cross-sectional view of a portion of a third preferred embodiment of the present invention.

FIG. 5 illustrates a third preferred embodiment of the present invention, in which the acoustic target is a reflector rather than an absorber of acoustic radiation. The embodiment of FIG. 5 is particularly suited for the measurement of acoustic beam cross-sectional profiles and focal distances. The embodiment comprises housing 120, float 122, lower insert 130, upper insert 132 and membrane 134. Housing 120 is similar or identical to the corresponding element of the embodiments of FIGS. 2 and 4. Float 122 comprises spherical reflecting target 124, support 126 and block 128 of magnetic material. Target 124 may comprise any suitable reflector of acoustic radiation. A hollow plastic structure such as a ping-pong ball would make a suitable reflecting target. Lower insert 130 and upper insert 132 in this embodiment are selected to be efficient absorbers of acoustic radiation. A suitable material for the upper and lower inserts is rubber. As with the embodiments employing absorbing targets, acoustic radiation is introduced directly into liquid 136 in upper chamber 138. The acoustic radiation passes through membrane 134, and impinges upon reflecting target 124. The radiation reflected by target 124 is then absorbed by the upper and lower inserts. The acoustic radiation reflected from target 124 produces a downward force upon float 122, and the downward force is measured as described above for the embodiment of FIG. 2.

Figure 6:
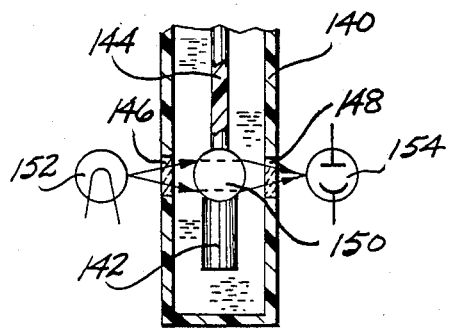
FIG. 6 is a schematic view of an alternate position sensing mechanism.

FIG. 6 presents an alternate means for sensing the height of the float, and in particular, the height of the block of magnetic material in the stem. In FIG. 6, numeral 140 represents the depending stem of the housing, in which block 142 of magnetic material is suspended by support 144 from the acoustic target (not shown). Stem 140 includes transparent windows 146 and 148 on opposite sides thereof. The float includes spherical converging lens 150 connected to support 144 near the lower end thereof. The lens is positioned such that when the float is at its zero level, the lens is at the same level as windows 146 and 148. A source of illumination, indicated schematically at 152, is positioned to direct radiation (e.g. visible or infrared) into window 146. The radiation then passes through lens 50, through window 148, and onto a suitable photodetector array indicated schematically at 154.

Figure 7:
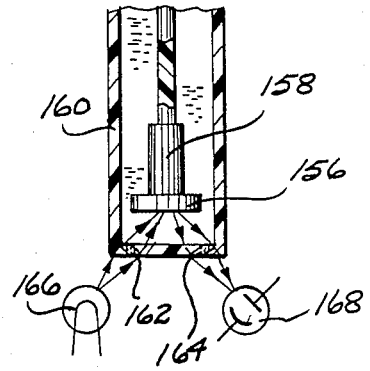
FIG. 7 is a schematic view of a second alternate position sensing mechanism.

FIG. 7 sets forth a second alternative embodiment for the position sensing means. In FIG. 7, mirror 156 is secured to the bottom end of block 158 of magnetic material. The bottom of stem 160 includes lenses 162 and 164. When the float is at its zero position, radiation from source 166 passes through lens 162, is reflected from mirror 156, passes through lens 164, and is detected by the photodetector array indicated schematically at 168.

Figure 8:
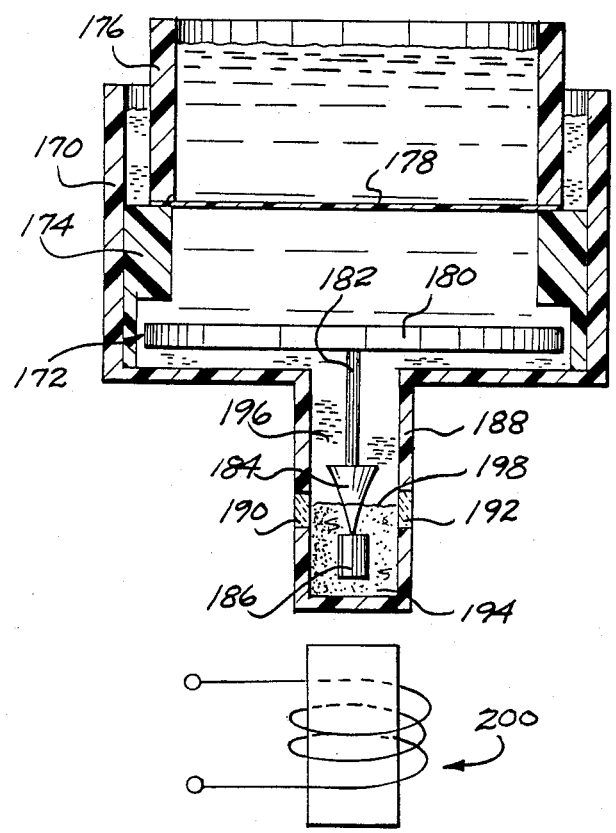
FIG. 8 is a vertical cross-sectional view of a portion of a fourth preferred embodiment of the present invention.

A further embodiment of the present invention is illustrated in FIG. 8. In the embodiment of FIG. 8, the servo system for controlling the electromagnet is eliminated, and the electromagnet is instead controlled directly by an operator such that the float remains at a preestablished height. The embodiment comprises housing 170, float 172, lower insert 174, upper insert 176 and membrane 178. Float 172 includes acoustic target 180, support 182, tapered cylinder 184 and block 186 of magnetic material. Housing 170 includes depending stem 188 having windows 190 and 192 on opposite sides thereof at an intermediate position along the height of the stem. Housing 170 in this embodiment is filled with two immiscible liquids, higher density liquid 194 and lower density liquid 196. The volume of higher density liquid 194 is adjusted such that boundary 198 between the two immiscible liquids is at the same height as windows 190 and 192. The embodiment of FIG. 8 also includes electromagnet 200 positioned beneath stem 188.

As with previously described embodiments, the apparatus shown in FIG. 8. is used by measuring the magnitude of the current to the electromagnet both before and after the introduction of acoustic radiation. For each measurement, an operator first adjusts the magnitude of the drive current to electromagnet 200 such that float 172 is at a preestablished zero level. Such zero level may conveniently be defined by providing alignment marks on tapered cylinder 184 and on windows 190 and 192, or by use of an LVDT sensor. Because liquids 194 and 196 have different densities, the magnitude of the buoyant force in the embodiment of FIG. 8 increases as the height of float 172 decreases. The shape of tapered cylinder 184 is preferably selected such that as the float moves downward, the upward buoyant force increases at a rate faster than the downward magnetic force exerted by electromagnet 200. In such a case, for any given magnetic force (i.e., for any given electromagnet drive current), float 172 will possess a stable equilibrium level, allowing the operator to readily adjust the level of float 172 to its zero level. For maximum sensitivity, the density of liquids 194 and 196 should be selected to be as close to one another as possible.

As described previously, the apparatus illustrated and described herein possesses the unique advantage that there is no mechanical contact between the radiation target and the remainder of the apparatus, thereby permitting construction of power measuring devices of extreme sensitivity. This sensitivity can be exploited by employing the apparatus to measure forces roduced by other (i.e., nonacoustic) stimuli that can exert a force without contacting the target. In particular, the apparatus described and illustrated above can be used to measure the power of electromagnetic radiation.

For comparatively high-powered electromagnetic radiation sources, for example microwave ovens, the apparatus can respond to and measure the direct radiation force against the target. For such an application, the apparatus of FIG. 2 would be modified by removal of upper insert 22 (including membrane 20) and liquid 44, the apparatus would be turned upside down, and the electromagnetic radiation would be directed upwards to strike target 46 of float 16. In one embodiment, target 46 would be constructed of a suitable material, such as a black rubber compound, to absorb the electromagnetic radiation. In such an embodiment, the net gravitational force would act downward, the magnetic force would act upward, and the radiation force would also act upward. Equations (1)-(3) above would therefore apply to the calculation of the radiation force. In a second embodiment, target 46 could be selected to reflect the electromagnetic radiation, either back out towards the radiation source or laterally. In the latter case, a device such as lower insert 130 of the apparatus of FIG. 5 would be used to absorb the reflected electromagnetic radiation. A suitable reflecting target would be an aluminum cone tapered at an angle of 45°.

A preferred apparatus for the indirect measurement of the power of electromagnetic radiation would be identical to the apparatus shown in FIG. 2 with upper insert 22 removed. In such an apparatus, target 46 would comprise a material adapted to absorb the electromagnetic radiation, whereby the temperature of the target would rise and its density would decrease. As a result, the net gravitational force (i.e., the positive buoyancy) would increase, resulting in a measurable change in the magnetic force. In particular, following the conventions of Equations (1)-(3) above, the magnitude of control signal 82 would be first measured prior to the introduction of electromagnetic radiation. In this circumstance, servo control system 80 would adjust the control signal, such that the float is stationary at its zero level, at which time:

$$F_{G1}+F_{M1}=0 \qquad (4)$$

where $F_{G1}$ designates the net gravitational force on the float prior to the heating of the float by the electromagnetic radiation. After the float is heated by the electromagnetic radiation, servo system 80 adjusts the control signal and the magnetic field such that the float remains at its zero level, at which time:

$$F_{G2}+F_{M2}=0 \qquad (5)$$

where $F_{G2}$ is the net gravitational force after the target has changed density. Combining Equations (4) and (5), the net change in the buoyancy of the target B can be expressed as:

$$B=F_{G2}-F_{G1}=F_{M1}-F_{M2} \qquad (6)$$

The relationship between the buoyancy change B and the power of the electromagnetic radiation can be established by routine calibration procedures. In a second embodiment for the indirect measure of the power of electromagnetic radiation, the apparatus of FIG. 2 is turned upside down, and liquid 40 is not present. In this embodiment, equations (4)-(6) apply, with the net gravitational force acting downward and a magnetic force acting upward. Buoyancy forces in this embodiment result from the gas surrounding the float means, such gas preferably being the ambient atmosphere, i.e., the housing that contains the float means is open to the atmosphere. Although the buoyancy force due to air is much smaller than the buoyance force due to a liquid, this "air" embodiment avoids undesired effects such as reflection of the electromagnetic radiation at an air/liquid interface. In a third embodiment for indirectly measuring electromagnetic radiation, the target and surrounding fluid are adapted such that the target reflects the radiation and the fluid absorbs the radiation. In this case, the change in buoyancy force indicated in FIG. 6 is a result of change in the density of the liquid rather than the target.

While the preferred embodiments of the invention have been illustrated and described, it should be understood that variations will be apparent to those skilled in the art. For example, the orientation of the float could be reversed such that the block of magnetic material was at the upper end of the float. In such an embodiment, the electromagnet would be positioned above the float, and the acoustic radiation would be directed upward onto the acoustic target. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. An apparatus for measuring the power of radiation, the apparatus comprising:
   float means including a target for the radiation, the float means being constructed such that the net gravitational force, including buoyancy force, if any, acting on the float means tends to accelerate the float means in a first direction; and
   force balancing means including drive means for providing a drive signal and means responsive to the drive signal for exerting an attractive balancing force on the float means in a second direction opposite to the first direction such that the magnitude of the balancing force corresponds to a characteristic of the drive signal, the drive means being adapted to vary said characteristic of the drive signal, to thereby vary the balancing force on the float means, such that when the drive signal is controlled so as to cause the float means to be suspended at a predetermined height, and characteristic of the drive signal provides a measure of the force exerted on the target as a result of the radiation striking the target, and therefore of the power of the radiation.

2. The apparatus of claim 1, wherein the float means comprises a magnetic material, and wherein the force balancing means comprises an electromagnet positioned to exert a magnetic force in the second direction on the magnetic material.

3. The apparatus of claim 2, wherein the force balancing means includes means for controlling the drive signal such that the float means is suspended at the predetermined height.

4. The apparatus of claim 3, wherein the means for controlling the drive signal includes sensor means adapted to produce a sensor signal corresponding to the height of the float means, and servo means responsive to the sensor signal for controlling the drive signal such that the float means is suspended at the predetermined height.

5. The apparatus of claim 4, further comprising a housing and a fluid in the housing, the float means being immersed in the fluid, and the net gravitational force including a buoyancy force exerted on the float means by the fluid.

6. The apparatus of claim 5, wherein the radiation is electromagnetic radiation, wherein the target is adapted to absorb the electromagnetic radiation and to undergo a density change as a result of heating due to absorption of the electromagnetic radiation, whereby the force exerted on the target as a result of the radiation comprises a change in the buoyancy force.

7. The apparatus of claim 6, wherein the fluid is a gas open to the atmosphere.

8. The apparatus of claim 5, wherein the housing includes a bottom wall shaped so as to form a hollow stem, wherein the float means includes a projecting member that includes the magnetic material, the relative sizes of the projecting member and the stem being such that the projecting member can move vertically within the stem without contacting the walls thereof.

9. The apparatus of claim 8, further comprising means for providing a magnetic centering field that is operative to act on the magnetic material of the float means to prevent the projecting member from contacting the walls of the stem.

10. The apparatus of claim 5, wherein the fluid is a liquid, and wherein the housing comprises bottom and side walls adapted to contain the liquid.

11. The apparatus of claim 10, wherein the float means including the target has a positive buoyancy when submerged in the liquid, and wherein the force balancing means produces a downwardly-directed magnetic balancing force.

12. The apparatus of claim 4, wherein the radiation is electromagnetic radiation, wherein the target is adapted to absorb or reflect the electromagnetic radiation, wherein the net gravitational force is directed downward, and wherein the electromagnet is positioned to exert an upward magnetic force on the float means.

13. An apparatus for measuring the power of acoustic radiation, comprising:
   a housing including bottom and side walls, the housing being adapted to contain a volume of liquid and to permit a source of acoustic radiation to radiate acoustic radiation into the liquid;
   float means positioned in the housing, the float means including an acoustic target and having a positive buoyancy when submerged in the liquid; and,
   force balancing means including drive means for providing a drive signal and means responsive to the drive signal for exerting a downward force on the float means such that the magnitude of the downward force corresponds to a characteristic of the drive signal, the drive means being adapted to vary said characteristic of the drive signal, to thereby vary the downward force on the float means, such that when the drive signal is controlled so as to cause the float means to be suspended at a predetermined height in the liquid, said characteristic of the drive signal provides a measure of the force exerted on the acoustic target by the acoustic radiation and therefore of the power of the acoustic radiation.

14. The apparatus of claim 13, wherein the force balancing means includes means for controlling the drive signal such that the float means is suspended at the predetermined height.

15. The apparatus of claim 14, wherein the means for controlling the drive signal includes sensor means adapted to produce a sensor signal corresponding to the height of the float means, and servo means responsive to the sensor signal for controlling the drive signal such that the float means is suspended at the predetermined height.

16. The apparatus of claim 13, wherein the float means comprises a magnetic material, and wherein the means for exerting a downward force on the float means comprises an electromagnet positioned to exert a downward magnetic force on the magnetic material.

17. The apparatus of claim 16, wherein the bottom wall of the housing is shaped so as to form a hollow depending stem, wherein the float means includes a depending member that includes the magnetic material, the relative sizes of the depending member and the stem being such that the depending member can move vertically within the stem without contacting the walls thereof.

18. The apparatus of claim 17, further comprising means for providing a magnetic centering field that is operative to act on the magnetic material of the float means to prevent the depending member from contacting the walls of the stem.

19. The apparatus of claim 13, further comprising a removable insert positioned in the housing, the insert being adapted to match the characteristics of the source of acoustic radiation to the characteristics of the acoustic target.

20. The apparatus of claim 19, wherein the acoustic target comprises a disc-like member of acoustic absorbing material extending substantially across the full cross section of the housing near the bottom wall thereof without contacting the side wall thereof, wherein the insert comprises an acoustic reflecting material and is shaped so as to form a chamber having a cross section that decreases with increasing height in the chamber, such is shaped so as to form a chamber having a cross section that decreases with increasing height in the chamber, such that when an acoustic source smaller than the acoustic target is positioned in the upper part of the chamber, the insert acts as a reflector to spread the acoustic energy from the acoustic source over the acoustic target.

21. The apparatus of claim 19, further comprising a membrane mounted by the insert and extending across the chamber above the acoustic target, the membrane being adapted to transmit acoustic energy from the acoustic source to the acoustic target but to block currents in the liquid.

22. The apparatus of claim 13, wherein the acoustic target is positioned in the housing such that acoustic radiation from the source will exert a downward force on the acoustic target.

23. An apparatus for measuring the power of acoustic radiation, comprising:
   a housing including bottom and side walls, the housing being adapted to contain a volume of liquid and to permit a source of acoustic radiation to radiate acoustic radiation into the liquid;
   an acoustic target positioned in the housing;
   means for measuring the force exerted on the acoustic target by the acoustic radiation and therefore the power of the acoustic radiation; and,
   a removable insert positioned in the housing, the insert being adapted to match the characteristics of the source of acoustic radiation to the characteristics of the acoustic target.

24. The apparatus of claim 23, wherein the acoustic target comprises a disk-like member of acoustic absorbing material exending substantially across the full cross section of the housing near the bottom wall thereof without contacting the side wall thereof, wherein the insert comprises an acoustic reflecting material and is shaped so as to form a chamber having a cross section that decreases with increasing height in the chamber, such that when an acoustic source smaller than the acoustic target is positioned in the upper part of the chamber, the insert acts as a reflector to spread the acoustic energy from the acoustic source over the acoustic target.

25. The apparatus of claim 23, further comprising a membrane mounted by the insert and extending across the chamber above the acoustic target, the membrane being adapted to transmit acoustic energy from the acoustic source to the acoustic target but to block currents in the liquid.

26. An apparatus for measuring the power of electromagnetic radiation, the apparatus comprising:
   a housing;
   a fluid in the housing;
   float means immersed in the fluid, the float means being constructed such that the net gravitational force, including the buoyancy force of the fluid on the float means, tends to accelerate the float means in a first direction; and,
   force balancing means including drive means for providing a drive signal and means responsive to the drive signal for exerting a balancing force on the float means in a second direction opposite the first direction such that the magnitude of the balancing force corresponds to a characteristic of the drive signal, the drive means being adapted to vary said characteristic of the drive signal, to thereby vary the balancing force on the float means, such that when the drive signal is controlled so as to cause the float means to be suspended at a predetermined height, said characteristic of the drive signal provides a measure of a change in the buoyancy force of the fluid on the float means resulting from the radiation heating and thereby changing the density of the fluid, and therefore of the power of the radiation.

* * * * *

UNITED STATES PATENT AND TRADEMARK OFFICE
CERTIFICATE OF CORRECTION

PATENT NO. : 4,625,542

DATED : December 2, 1986

INVENTOR(S) : Craig E. Nelson

It is certified that error appears in the above-identified patent and that said Letters Patent is hereby corrected as shown below:

Column 11, line 25, "and" should be --said--
Column 12, line 27, "belancing" should be --balancing--

Signed and Sealed this

Twenty-fourth Day of March, 1987

Attest:

DONALD J. QUIGG

Attesting Officer

Commissioner of Patents and Trademarks